United States Patent [19]

Satchell et al.

[11] Patent Number: 4,493,493

[45] Date of Patent: Jan. 15, 1985

[54] ALIGNMENT ADJUSTMENT APPARATUS FOR VEHICLE WHEEL SUSPENSION

[75] Inventors: Terry L. Satchell, Rochester; Robert E. Custance, Warren, both of Mich.

[73] Assignee: General Motors Corporation, Detroit, Mich.

[21] Appl. No.: 434,901

[22] Filed: Oct. 18, 1982

[51] Int. Cl.³ .................................. B62D 17/00
[52] U.S. Cl. .................................................. 280/661
[58] Field of Search ............ 280/661, 675, 772; 180/73 A; 72/704

[56] References Cited

U.S. PATENT DOCUMENTS

| | | | |
|---|---|---|---|
| 3,285,622 | 11/1966 | Castoe | 280/661 |
| 3,819,202 | 6/1974 | Castoe | 280/96.2 B |
| 4,029,337 | 6/1977 | Bishop | 280/661 |
| 4,030,737 | 6/1977 | Bridges | 280/661 |
| 4,194,760 | 3/1980 | Shiomi et al. | 280/661 |
| 4,243,339 | 1/1981 | Dickerson | 280/661 |
| 4,372,575 | 2/1983 | Hyma | 280/661 |
| 4,373,743 | 2/1983 | Parsons | 280/661 |
| 4,418,938 | 12/1983 | Sullivan et al. | 280/661 |
| 4,424,984 | 1/1984 | Shiratori et al. | 280/661 |

Primary Examiner—Richard A. Bertsch
Attorney, Agent, or Firm—Dean L. Ellis

[57] ABSTRACT

A lateral control link of an independent rear wheel vehicle suspension is provided at its inboard pivot connection with an adjustment lever swingable on a support bracket of the vehicle chassis by insertion of a hand tool to facilitate manual adjustment of the vehicle wheel toe-in setting.

3 Claims, 4 Drawing Figures

ALIGNMENT ADJUSTMENT APPARATUS FOR VEHICLE WHEEL SUSPENSION

This invention relates to vehicle wheel suspensions and to vehicle wheel alignment provisions for such wheel suspensions.

In many vehicle wheel suspensions, wheelguiding longitudinal and laterally oriented control arms or links extend from connection at one end on the vehicle chassis to connect at the other end on a resiliently displaceable wheel support member or knuckle, independently of connection with other of the vehicle wheels. It is sometimes desired to provide in such independent suspension an adjustability during vehicle service inspections for the alignment of the wheel and its supporting knuckle to maintain proper vehicle handling and tire wear resistance properties. It has been known to provide camber, toe-in or like adjustment in these suspensions by means of eccentric washer style bolt fastener assemblies rotatable to various angular positions to alter the relation of the link or the knuckle on the vehicle chassis. While effective for the intended purpose, such prior arrangements are not easily incorporated in every chassis environment nor are service technicians always adept in their use.

The instant invention provides an efficient alternative to such prior apparatus and employs an adjustment lever at the chassis mount or bracket of a suspension control link in such manner that alignment is easily accomplished by simple swinging of the lever about a fulcrumed end thereof on the chassis to positively bodily adjust relative thereto the link and wheel location to attain the desired alignment reading. Among other features contemplated for the invention, the lever is adapted for facile manipulation by insertion of a simple hand pry tool such as a screwdriver or the like. It includes utilizing the adjustment lever if desired as a device associated with a conventional bolt fastener assembly mounting the control link on the chassis and operative to hold the adjusted position under the tension of the tightened fastener bolt. In one embodiment, the adjustment lever takes the form of a generally U-shaped or closed figure stamped sheet metal member each leg of which is conveniently interposed between a vertical wall of a chassis bracket wall at one side and the end of the internal load bearing sleeve of the well-known rubber bushing or other conventional pivot element usually affixed to the end of the control link and held by the fastener bolt. The apparatus imposes little design change in the customary bracketing for such pivot elements, requiring only an aligned pair of slots in the bracket walls receiving the fastener bolt to permit limited relocation of the lever, the bolt, and the pivot element end of the control link in directions longitudinally of the latter to achieve the desired alignment condition. The adjustment lever is elongated and suitably bored intermediate its ends to receive the fastener bolt and with the adjustment lever fulcrumed on the chassis at one end thereof moderate manual force may be applied to the other end of the lever as with a pry tool with such mechanical advantage as to carry the entire control link and the wheel knuckle to the desired adjusted condition with positiveness and ease. These and other features and advantages of the invention will be readily apparent from the following specification and from the drawings wherein:

Figure 1:
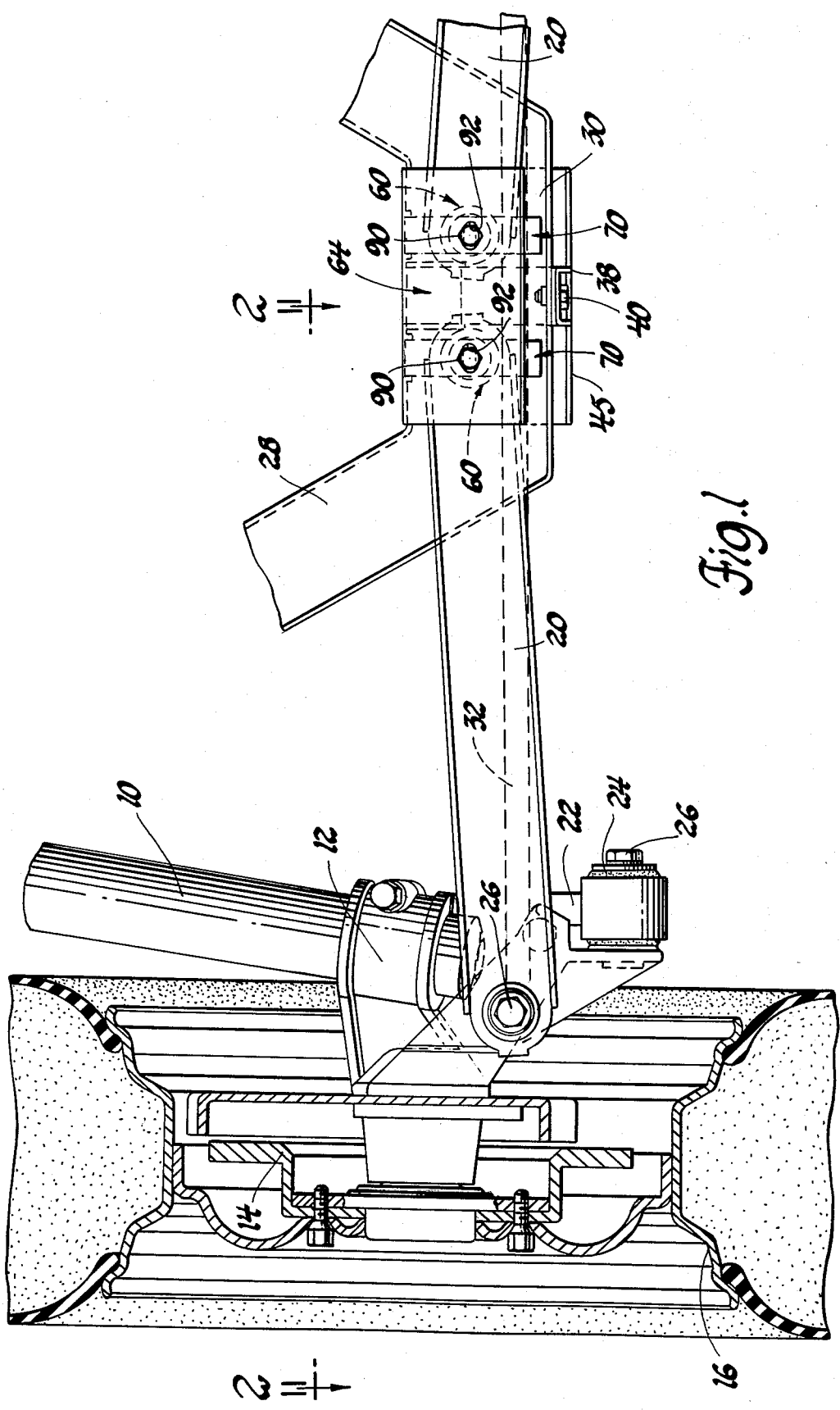
FIG. 1 is a partially sectioned fragmentary rear elevational view of an independent rear wheel suspension for automotive vehicles including alignment adjustment apparatus in accordance with this invention.

Referring now particularly to FIG. 1, the same illustrates a known variety of independent rear wheel suspension, for each rear wheel of which, only one being illustrated, there is provided a generally vertically disposed hydraulic shock absorbing suspension strut member 10. As well known, such strut member may be fixedly secured at its upper end, not shown, to appropriate strut mounting structure of the vehicle chassis frame, or of the sheet metal superstructure in the case of an integral body/frame vehicle. At its lower end, each strut 10 has fixedly secured thereto the annular mounting hub portion of a wheel support member or knuckle 12. The knuckle 12 is of well known type, forged or cast, and generally including various integrally formed elements adapted to the pivotal securement thereto of suspension control linkage members which extend between the knuckle and the vehicle chassis or superstructure. Such linkage controls displacement of the knuckle and the vehicle wheel carried thereby during operation of the vehicle on the road. Among its portions, the knuckle includes a spindle, not shown, rotatably mounting a wheel hub and brake disc assembly 14, to which is secured by the usual lug nuts a conventional vehicle wheel and tire assembly 16.

Figure 2:
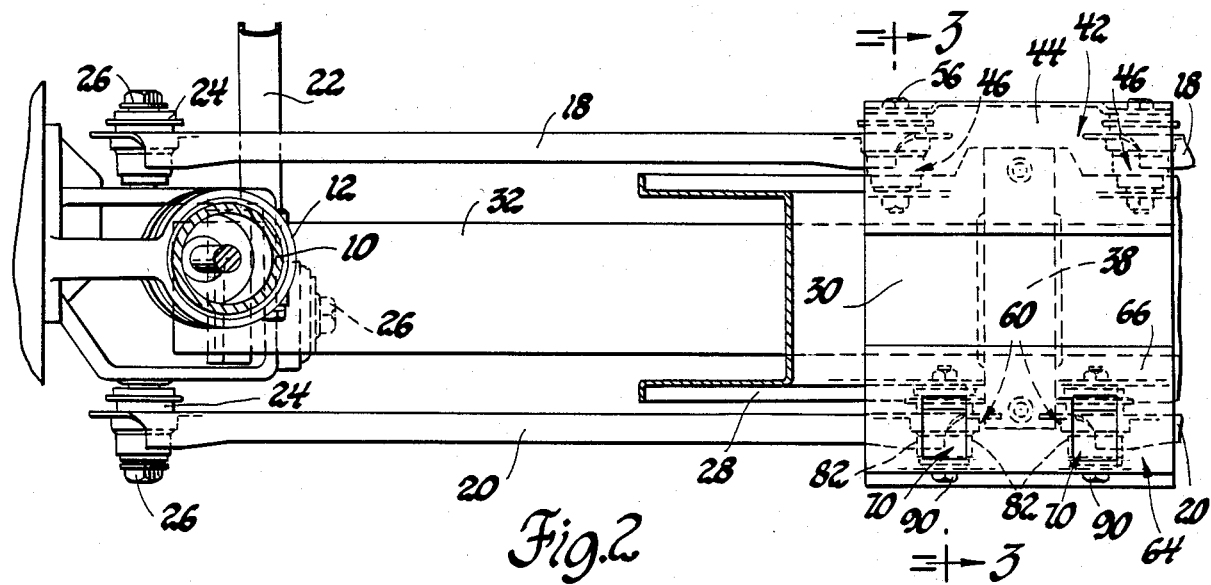
FIG. 2 is a view taken generally along the plane indicated by lines 2—2 of FIG. 1.

Referring now also to FIG. 2, the independent rear suspension control linkage for each wheel 16 may specifically include a spaced pair of lateral swingable control links or members 18 and 20. A further longitudinal control link 22 extends forwardly from knuckle 12 to a pivotal connection, not shown, on the vehicle chassis or superstructure so as to provide the fore and aft control of displacement of the knuckle relative the chassis. The adjacent ends of links 18, 20 and 22 are rotatably connected to the knuckle 12 by conventional shock isolating rubber connector elements or pivot bushings 24. Such bushings typically are fixedly received within apertures pierced in the outboard end of each link 18, 20 and 22 and secured to the knuckle by fastener studs 26 extending through the bushings.

Adjacent its vehicle centerline, the chassis frame or superstructure includes a cross member 28 including depending convergent channel sectioned portions merging with a central, generally horizontally disposed and downwardly opening channel portion 30. As seen also in FIG. 3, a primary suspension spring for the two rear wheels of the vehicle is embodied as a resilient beam or leaf spring 32 extending transversely across the width of the vehicle. At each end, it bears upon an upwardly facing element of knuckle 12. Intermediate its ends, it lies within channel portion 30 and is there secured to the vehicle chassis or superstructure by means of a pair of clamping elements, 34 and 36, bolted or otherwise fixed to channel portin 30 such as by a securement strap 38 fastened as at 40 to flanges of channel portion 30.

Figure 3:
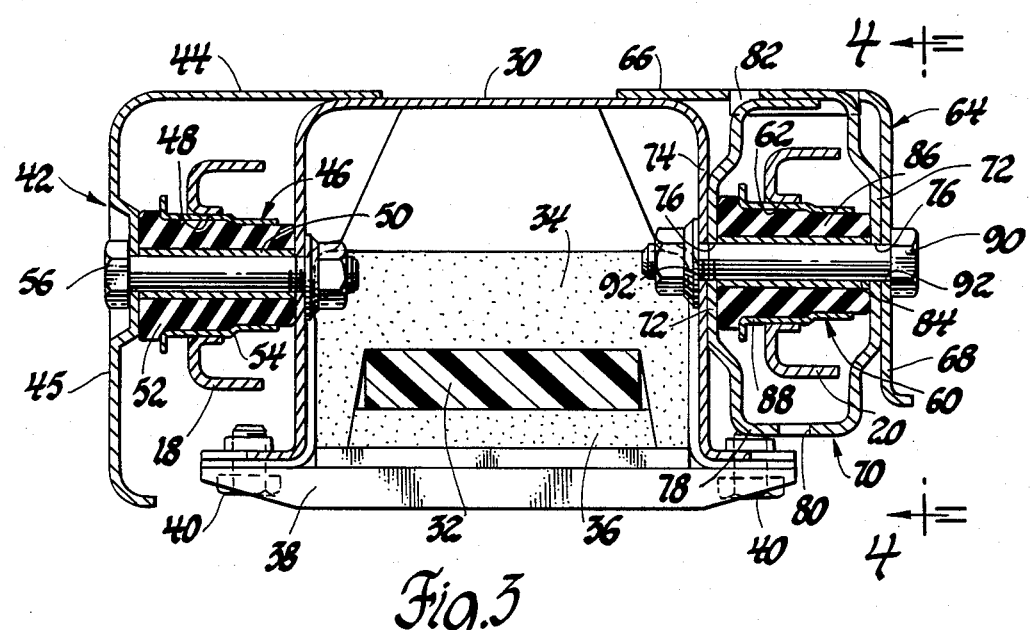
FIG. 3 is an enlarged sectional view taken generally along the plane indicated by lines 3—3 of FIG. 2.

Referring to FIGS. 2 and 3, the inboard end of each link 18 and 20 is connected to the cross member 28. For link 18, a bracket 42 is welded or otherwise secured at its upper horizontally extending flange 44 to the channel section 30, and its depending flange 45 encloses a pivot connector element or bushing 46 which is retained within an aperture 48 at the end of link 18. Bushing 46 conventionally includes an internal fastener load bearing sleeve 50 surrounded by a rubber or other elastomeric bushing 52 in turn enclosed by a metal sleeve 54 secured to a flange of link 18 surrounding its aperture 48. A conventional bolt and nut fastener assembly 56 extends through sleeve 50 and through aligned bores in flange 45 of bracket 42 and the opposed wall of channel portion 30 to pivotally secure link 18 on the chassis.

Similar such pivot connector apparatus is provided at the inboard end of lateral link 20. However, it is desired in this embodiment of independent rear suspension that each link 20 have provision for adjustment of toe-in (or toe-out), i.e., adjustment of the difference in the transverse distances between the symmetrical vertical planes of the two rear wheel and tire assemblies 16 measured, respectively, at the extreme rear and front points of the tire treads. This is accomplished by an adjustment or longitudinal bodily movement of the rear lateral links 20 toward or away from such longitudinal center plane of the chassis, with links 18 remaining fixed. By the instant invention, such adjustment is accomplished with an economy of simply fabricated parts. The conventional pivot connector element or bushing 60 is again provided in an aperture 62 of the inboard end of link 20 and is enclosed within another bracket 64 generally similar to the bracket 42. As seen in FIG. 3, such bracket 64 again includes a horizontal flange 66 welded or otewise affixed to the channel section 30 and further a depending vertical flange 68. An adjustment lever 70, preferably formed as a closed figure or box member, is installed to have vertical legs 72 thereof lie, respectively, between the bushing 60 and the flange 68 at one side, and between the bushing and the vertical wall 74 of channel section 30 at the other side.

Each leg 72 intermediate its length has a bore 76 aligned on a horizontal, generally longitudinally directed axis of the vehicle chassis. The legs 72 are bent from an integral lower tool web 78 having a tool aperture 80 therein. At its upper end the adjustment lever 70 has the legs 72 thereof connected by turned flanges which may be spot welded together. In the area of such upper end of the lever, the horizontal flange 66 of bracket 64 is lanced to provide an opening receiving the upper end of the lever, and a pair of downwardly turned tabs or flanges 82 extend the width of the aperture and abut the upper end of the lever to provide a fulcrum.

Figure 4:
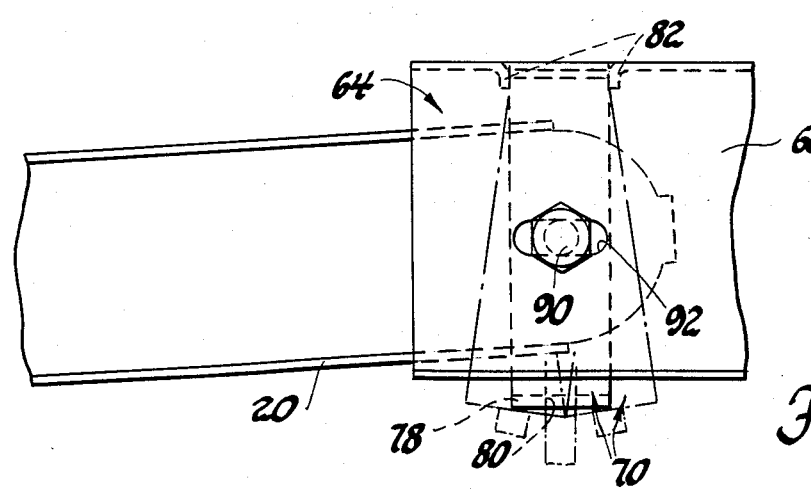
FIG. 4 is a view taken along the plane indicated by lines 4—4 of FIG. 3 and indicating various alignment conditions of the adjustment apparatus.

As seen in FIG. 3, bushing 60 again conventionally includes an internal sleeve 84, rubber element 86, and outer sleeve 88, and a bolt and nut fastener assembly 90 projects through such sleeve and the alignment bores 76 of the legs 72. Referring to FIG. 4, wall 74 and flange 68 of the chassis cross member and bracket are provided with slots 92 which carry the ends of the bolt fastener 90 and permit lateral bodily longitudinal adjustment of control link 20 relative to the cross member 28.

To accomplish adjustment of the toe-in of each wheel and tire assembly 16, bolt and nut fastener 90 is loosened to allow such longitudinal lateral displacement of link 20. As seen in FIG. 4, a hand tool such as a screwdriver or other pry member may be inserted in aperture 80 of the adjustment lever and manual force exerted to very simply swing the lever about the fulcrum thereof at flanges 82 to any of the various angular positions thereof such as indicated. Such swinging movement of the lever in turn carries the bolt fastener 90, the bushing 60, and link 20 therewith and accomplishes the desired toe-in adjustment whereupon the fastener may be retightened.

While various specific embodiments of the invention are practical and useful, the illustrated embodiment achieves advantages in utilizing the legs 72 of the adjustment lever as large area washers which bear directly under fastening torque upon the sleeve 84 of bushing element 60, thereby to supplant washers otherwise provided. Moreover, such large engagement area afforded between each leg 72 and its respective wall 74 or flange 68 of the bracket structure enables a large frictional clamping engagement to occur under relatively moderate amounts of such torque applied to the bolt fastener 90. Substantially positive securement of the inboard end of link 20 is thus afforded without the need for special provisions usually encountered with the eccentric or other alignment adjusting elements as in past practice. However, variations of the presently disclosed invention may of course be utilized wherein the lever is not so situated within the enclosed bracket structure. It will further be appreciated that the disclosed apparatus is useful for other than toe adjustment and may readily be utilized in this and other independent suspension mechanisms for adjustment of camber, caster and the like.

The embodiments of the invention in which an exclusive property or privilege is claimed are defined as follows:

1. In wheel suspension for an automotive vehicle including a wheel carrier and a link extending for pivotal interconnection at one end thereof to support structure at a selected location on the vehicle chassis and at the other end thereof to the wheel carrier to control displacement of the latter relative the vehicle chassis, alignment adjustment mounting apparatus comprising bracket means affixed to the chassis support structure including opposed vertical walls having aligned generally horizontally extending slots adapted for reception therewithin of a fastener bolt, a connector element affixed to said one end of the control link centrally bored and received between said walls in axial alignment with said slots, a generally vertically oriented adjustment lever including intermediate its ends a bore axially aligned with said connector element, bolt fastener means extending through said connector element, said slots and said aligned bore of the adjustment lever, means on said support structure cooperating with one end of said adjustment lever to provide a fulcrum for rotation of the latter thereabout, and means at the other end of the adjustment lever adapted for reception of a hand tool for application of manual force to swing the adjustment lever about said fulcrum to bodily longitudinally carry said control link and in turn the wheel carrier relative the vehicle chassis to various wheel alignment positions.

2. In wheel suspension for an automotive vehicle including a wheel carrier and a link extending for pivotal interconnection at one end thereof to support structure at a selected location on the vehicle chassis and at the other end thereof to the wheel carrier to control displacement of the latter relative the vehicle chassis, alignment adjustment mounting apparatus comprising bracket means on the chassis support structure including opposed vertical walls having aligned generally horizontally extending slots adapted for reception therewithin of a fastener bolt, a shock isolation bushing affixed to said one end of the control link and received between said walls in axial alignment with said slots, a generally vertically oriented adjustment lever including a pair of vertical legs each engaging an adjacent said wall, each said leg including intermediate its ends a bore axially aligned with said bushing, bolt fastener means extending through said bushing, said aligned bores of the legs of the adjustment lever, and through said slots, means on said bracket means cooperating with the ends of the legs of said adjustment lever at one end thereof to provide a fulcrum for rotation of the latter thereabout, and a tool web at the other end of the adjustment lever forming said legs thereof and adapted for reception of a hand tool for application of manual force to swing the adjustment lever about said fulcrum to bodily longitudinally carry said control link and in turn the wheel carrier relative the vehicle chassis to various wheel alignment positions.

3. In wheel suspension for an automotive vehicle including a wheel carrier and a link extending for pivotal interconnection at one end thereof to support structure at a selected location on the vehicle chassis and at the other end thereof to the wheel carrier to control displacement of the latter relative the vehicle chassis, alignment adjustment mounting apparatus comprising bracket means on the chassis support structure including opposed vertical walls having aligned slots adapted for reception and translation therewithin of a fastener bolt, a shock isolation bushing affixed to said one end of the control link and received between said walls, said bushing including an internal load bearing sleeve in axial alignment with said slots, a generally vertically oriented adjustment lever including a pair of vertical legs each interposed in load bearing relation between one end of said sleeve and an adjacent said wall, each said leg including intermediate its ends a bore axially aligned with said sleeve, a bolt fastener means extending through said sleeve, said aligned bores of the legs of the adjustment lever, and through said slots, means on said bracket means cooperating with the legs of said adjustment lever at one end thereof to provide a fulcrum for rotation of the latter thereabout, and a tool web at the other end of the adjustment lever joining said legs thereof and adapted for reception of a hand tool for application of manual force to swing the adjustment lever about said fulcrum to bodily longitudinally carry said control link and establish various alignment positions of the wheel carrier relative the vehicle chassis to various wheel alignment positions.

* * * * *